(12) United States Patent
Bono et al.

(10) Patent No.: US 11,489,182 B2
(45) Date of Patent: Nov. 1, 2022

(54) FUEL CELL SYSTEM

(71) Applicant: TOYOTA JIDOSHA KABUSHIKI KAISHA, Toyota (JP)

(72) Inventors: Tetsuya Bono, Miyoshi (JP); Kenji Umayahara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/802,706

(22) Filed: Feb. 27, 2020

(65) Prior Publication Data

US 2020/0295392 A1  Sep. 17, 2020

(30) Foreign Application Priority Data

Mar. 14, 2019  (JP) .............................. JP2019-046956

(51) Int. Cl.
*H01M 8/04858* (2016.01)
*B60L 58/33* (2019.01)
*B60L 58/40* (2019.01)
*H01M 8/04089* (2016.01)

(52) U.S. Cl.
CPC ......... *H01M 8/04932* (2013.01); *B60L 58/33* (2019.02); *B60L 58/40* (2019.02); *H01M 8/04089* (2013.01); *H01M 2250/20* (2013.01)

(58) Field of Classification Search
CPC ...... B60L 58/33; B60L 58/40; H01M 16/006; H01M 2250/20; H01M 2250/402; H01M 8/04089; H01M 8/04619; H01M 8/04626; H01M 8/04932; H01M 8/0494; H01M 8/04992
See application file for complete search history.

(56) References Cited

U.S. PATENT DOCUMENTS

| | | |
|---|---|---|
| 2005/0227131 A1 | 10/2005 | Ueda et al. |
| 2009/0029197 A1 | 1/2009 | Hibino et al. |
| 2011/0217608 A1* | 9/2011 | Matsumoto ....... H01M 8/04619 429/428 |
| 2013/0164641 A1* | 6/2013 | Fukuda ............. H01M 8/04097 429/444 |
| 2017/0355278 A1* | 12/2017 | Fukami ................. B60L 3/0046 |
| 2019/0029197 A1 | 1/2019 | Van Wingerden |

FOREIGN PATENT DOCUMENTS

| | | |
|---|---|---|
| JP | 2005302562 A | 10/2005 |
| JP | 2006059708 A | 3/2006 |
| JP | 2007026933 A | 2/2007 |
| JP | 2009295517 A | 12/2009 |
| JP | 2010238530 A | 10/2010 |
| JP | 2012099495 A | 5/2012 |
| JP | 2013164917 A | 8/2013 |
| JP | 2013176213 A | 9/2013 |
| WO | 2010112998 A1 | 10/2010 |

* cited by examiner

*Primary Examiner* — Adam A Arciero
(74) *Attorney, Agent, or Firm* — Dickinson Wright, PLLC

(57) ABSTRACT

A fuel cell system configured to supply electric power to load includes: a fuel cell; and a control unit configured to set target electric power to be generated by the fuel cell and control electric power generation by the fuel cell such that the fuel cell generates the target electric power. The control unit is configured to, when setting the target electric power using request electric power that the load requests the fuel cell to generate, execute a fluctuation suppression process for making a fluctuation of the target electric power smaller than a fluctuation of the request electric power.

3 Claims, 10 Drawing Sheets

FUEL CELL SYSTEM

INCORPORATION BY REFERENCE

The disclosure of Japanese Patent Application No. 2019-046956 filed on Mar. 14, 2019 including the specification, drawings and abstract is incorporated herein by reference in its entirety.

BACKGROUND

1. Technical Field

The disclosure relates to a fuel cell system.

2. Description of Related Art

Fuel cell systems, configured to set an electric power amount to be generated by a fuel cell so as to obtain electric power corresponding to a load request and to control units in the fuel cell system so as to achieve generation of the electric power amount, have conventionally been known (see, for example, Japanese Patent Application Publication No. 2006-59708).

SUMMARY

However, in the case of controlling electric power generation performed by the fuel cell so as to obtain from the fuel cell the electric power corresponding to a load request, inconvenience such as deterioration in component members constituting the fuel cell may occur when the load request changes, since the amount of electric power generated by the fuel cell changes in accordance with the change in the load request.

Accordingly, techniques for restraining such inconvenience are demanded.

The present disclosure can be implemented as the following aspects.

One aspect of the present disclosure provides a fuel cell system configured to supply electric power to load. The fuel cell system includes: a fuel cell; and a control unit. The control unit is configured to set target electric power to be generated by the fuel cell and control electric power generation by the fuel cell such that the fuel cell generates the target electric power. The control unit is configured to, when setting the target electric power using request electric power that the load requests the fuel cell to generate, execute a fluctuation suppression process for making a fluctuation of the target electric power smaller than a fluctuation of the request electric power. When setting the target electric power using the request electric power to the fuel cell, the fuel cell system of this aspect executes the fluctuation suppression process for making the fluctuation of the target electric power smaller than the fluctuation of the request electric power. This makes it possible to restrain the inconvenience attributed to fluctuation in the amount of electric power generated by the fuel cell relating to fluctuation of the request electric power.

The fuel cell system of the aspect, the control unit may include a fluctuation suppression reduction unit configured to reduce, in accordance with an operating state of the fuel cell system, a level of making the fluctuation of the target electric power smaller than the fluctuation of the request electric power in the fluctuation suppression process. When inconvenience occurs due to executing the fluctuation suppression process in accordance with the operating state of the fuel cell system, the fuel cell system of the above aspect can restrain such inconvenience.

The fuel cell system of the aspect may further include an electric storage device configured to store the electric power generated by the fuel cell. The fluctuation suppression reduction unit may be configured to use, as the operating state, allowable charge electric power that is an upper limit of charge electric power of the electric storage device, and when the allowable charge electric power is less than maximum generated electric power of the fuel cell, reduce the level of making the fluctuation of the target electric power smaller than the fluctuation of the request electric power. The fuel cell system of the aspect can restrain an overcharge of the electric storage device, and can restrain deterioration in the electric storage device attributed to the overcharge.

The fuel cell system of the aspect may further include an electric storage device configured to supply electric power to the load. The fluctuation suppression reduction unit may be configured to use, as the operating state, allowable output electric power that is an upper limit of output electric power of the electric storage device is used as the operating state, and when the allowable output electric power is less than maximum electric power consumption of the load, reduce the level of making the fluctuation of the target electric power smaller than the fluctuation of the request electric power. The fuel cell system of the aspect can restrain the state of charge of the electric storage device from becoming excessively low when the fluctuation suppression process is performed. This makes it possible to restrain the fuel cell system from failing to supply sufficient electric power for the request electric power.

In the fuel cell system of the aspect, the fuel cell system may be mounted on a fuel cell vehicle as a driving power source. The fluctuation suppression reduction unit may be configured to use vehicle speed of the fuel cell vehicle as the operating state, and when the vehicle speed is equal to or less than a predetermined first reference value, reduce the level of making the fluctuation of the target electric power smaller than the fluctuation of the request electric power in the fluctuation suppression process. When the vehicle speed of the fuel cell vehicle is equal to or less than the first reference value, and noise and vibration attributed to electric power generation by the fuel cell tend to give a user of the vehicle a sense of discomfort, the fuel cell system of the aspect can restrain the noise and vibration attributed to electric power generation by the fuel cell.

In the fuel cell system of the aspect, the fuel cell system may be mounted on a fuel cell vehicle as a driving power source. The fluctuation suppression reduction unit may be configured to use vehicle speed of the fuel cell vehicle and a history of output states of the fuel cell as the operating state, and when the vehicle speed is equal to or less than a predetermined second reference value, and the history of the output states of the fuel cell corresponds to a predetermined high output state, reduce the level of making the fluctuation of the target electric power smaller than the fluctuation of the request electric power in the fluctuation suppression process. According to the fuel cell system of the aspect, since the vehicle speed of the fuel cell vehicle is equal to or less than the second reference value, cooling power of the fuel cell using a running wind is relatively small, and the history of the output states of the fuel cell corresponds to a high output state. Accordingly, the fuel cell system of the aspect can restrain excessive heat generation by the fuel cell, when the amount of heat generation relating to electric power generation by the fuel cell becomes relatively large.

In the fuel cell system of the aspect, the fluctuation suppression process may be a low pass filter process for setting the target electric power by applying a low pass filter to the fluctuation of the request electric power. The fluctuation suppression reduction unit may be configured to reduce the level of making the fluctuation of the target electric power smaller than the fluctuation of the request electric power by decreasing a time constant in the low pass filter. When inconvenience occurs due to executing the fluctuation suppression process in accordance with the operating state of the fuel cell system, the fuel cell system of the above aspect can restrain such inconvenience by decreasing the time constant in the low pass filter.

In the fuel cell system of the aspect, the fluctuation suppression process may be an equalization process repeatedly executed in the control unit for calculating a representative value, among values each including target electric power, set during a period from a time point tracking back for a predetermined reference period from present time to a time point when the target electric power is previously set, and request electric power at the present time, and setting the representative value as the target electric power. The fluctuation suppression reduction unit may be configured to reduce the level of making the fluctuation of the target electric power smaller than the fluctuation of the request electric power in the fluctuation suppression process, by shortening the reference period. When inconvenience occurs due to executing the fluctuation suppression process in accordance with the operating state of the fuel cell system, the fuel cell system of the above aspect can restrain such inconvenience by shortening the reference period in the fluctuation suppression process.

In the fuel cell system of the aspect, the fluctuation suppression process may be a change rate regulation process for setting the target electric power by setting an upper limit for an increment of the target electric power per unit time, while setting a lower limit for a decrement of the target electric power per unit time. The fluctuation suppression reduction unit may be configured to reduce the level of making the fluctuation of the target electric power smaller than the fluctuation of the request electric power, by increasing the upper limit while decreasing the lower limit in the fluctuation suppression process. When inconvenience occurs due to executing the change rate restrict process in accordance with the operating state of the fuel cell system, the fuel cell system of the aspect can restrain such inconvenience by increasing the upper limit while decreasing the lower limit in the fluctuation suppression process.

In the fuel cell system of the aspect, the fluctuation suppression process may be a staged process for dividing an allowable range of the request electric power into a plurality of divided ranges, and increasing the target electric power in stages in accordance with increase in the request electric power such that when the request electric power belongs to an identical divided range, identical target electric power is set. The fluctuation suppression reduction unit may be configured to reduce the level of making the fluctuation of the target electric power smaller than the fluctuation of the request electric power, by increasing the number of the divided ranges obtained by dividing the allowable range of the request electric power in the fluctuation suppression process. When inconvenience occurs due to executing the fluctuation suppression process in accordance with the operating state of the fuel cell system, the fuel cell system of the aspect can restrain such inconvenience by increasing the number of the divided ranges in the staged process In the fuel cell system of the aspect, the fluctuation suppression process may be any one process out of: (a) a low pass filter process for setting the target electric power by applying a low pass filter to the fluctuation of the request electric power; (b) an equalization process for calculating a representative value, among values each including target electric power set during a period from a time point tracking back for a predetermined reference period from present time to a time point when the target electric power is previously set, and request electric power at the present time, and setting the representative value as the target electric power; (c) a change rate regulation process for setting the target electric power by setting an upper limit for an increment of the target electric power per unit time, while setting a lower limit for a decrement of the target electric power per unit time; and (d) a staged process for dividing an allowable range of the request electric power into a plurality of divided ranges, and increasing the target electric power in stages in accordance with increase in the request electric power such that when the request electric power belongs to an identical divided range, identical target electric power is set. The fuel cell system of the aspect can make the fluctuation of the target electric power smaller than the fluctuation of the request electric power by any one process out of the low pass filter process, the equalization process, the change rate regulation process, and the staged process.

The present disclosure can be implemented in various aspects. For example, the present disclosure can be implemented in such aspects as a fuel cell vehicle, a control method of the fuel cell system, a computer program for implementing the control method, and a non-transitory recording medium that records the computer program thereon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
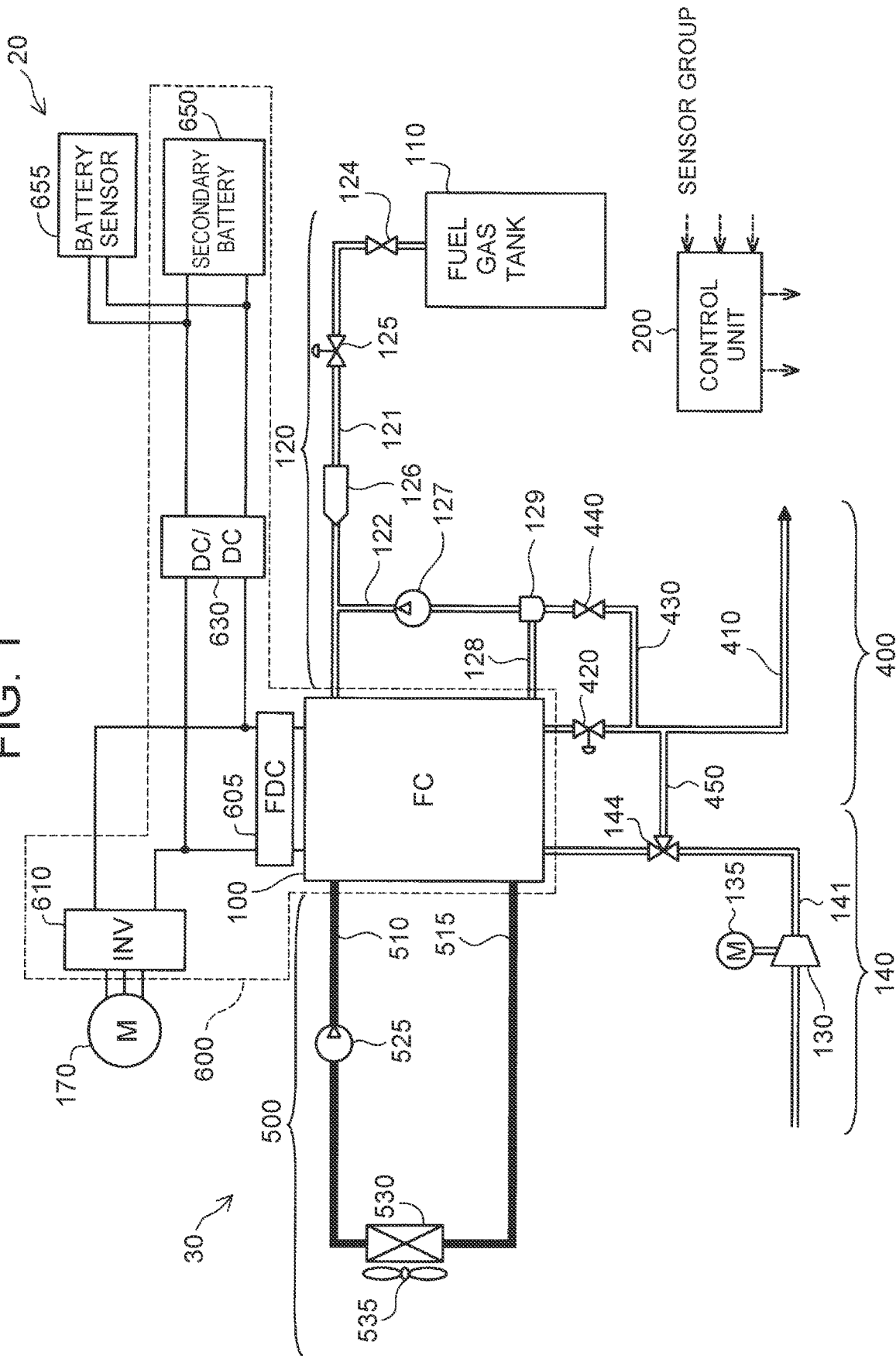
FIG. 1 is a block diagram showing a schematic configuration of a fuel cell vehicle.

A-1 Overall Configuration of Fuel Cell Vehicle:

FIG. 1 is an explanatory view schematically showing an outlined configuration of a fuel cell vehicle 20 as a first embodiment of the present disclosure. The fuel cell vehicle 20 includes a fuel cell system 30, an electric power circuit 600, a drive motor 170, and a control unit 200. The fuel cell system 30 is mounted on the fuel cell vehicle 20 as a driving power source. The fuel cell system 30 includes a fuel cell 100, a fuel gas supply system 120, an oxidation gas supply system 140, an exhaust gas system 400, and a cooling system 500.

The fuel cell 100 has a stack constitution formed of a stack of a plurality of single cells. Although the fuel cell 100 of the present embodiment is a polymer electrolyte fuel cell, fuel cells of other types, such as a solid oxide fuel cell, may also be adopted. In each of the single cells which constitute the fuel cell 100, a passage (an anode-side passage) for carrying fuel gas to an anode side, and a passage (a cathode-side passage) for carrying oxidation gas to a cathode side are formed with an electrolyte membrane interposed therebetween. In the fuel cell 100, a coolant passage for carrying coolant for cooling the fuel cell 100 is also formed.

The fuel gas supply system 120 includes a fuel gas tank 110, a hydrogen supply passage 121, a fuel gas discharge passage 128, a circulation passage 122, a main stop valve 124, a regulator 125, an injector 126, a gas-liquid separator 129, and a circulation pump 127. The fuel gas tank 110 is a storage device for storing hydrogen gas serving as fuel gas. The fuel gas tank 110 is connected to the fuel cell 100 through the hydrogen supply passage 121. In the fuel gas supply system 120, the hydrogen gas stored in the fuel gas tank 110 is supplied to the anode-side passage of the fuel cell 100 through switching of the hydrogen supply passage 121 by the main stop valve 124, pressure reduction in the regulator 125, and ejection from the injector 126.

The fuel gas discharge passage 128 is a passage for carrying anode offgas that is discharged from the fuel cell 100. The circulation passage 122 is connected to the fuel gas discharge passage 128 and to a region of the hydrogen supply passage 121 downstream from the injector 126. The pressure of the hydrogen that circulates through the circulation passage 122 is regulated by the circulation pump 127. A fuel gas amount supplied to the fuel cell 100 can be regulated based on the driving amounts of the injector 126 and the circulation pump 127. The driving amounts are controlled by the control unit 200.

The gas-liquid separator 129 is provided in a joint portion between the fuel gas discharge passage 128 and the circulation passage 122. In the gas-liquid separator 129, water and gas (such as hydrogen and nitrogen) in the anode offgas are separated. In the present embodiment, impurities including nitrogen and vapor are removed from the passage including the circulation passage 122 by means of the gas-liquid separator 129 and a purge valve 440 provided in the fuel gas discharge passage 430 described later.

The oxidation gas supply system 140 includes a compressor 130, an oxidation gas supply passage 141, and a flow dividing valve 144. The fuel cell 100 of the present embodiment uses air as oxidation gas. The compressor 130, which is driven by an air compressor motor 135, compresses air and supplies the air to the cathode-side passage of the fuel cell 100 through the oxidation gas supply passage 141. The flow dividing valve 144 is provided in a joint portion in the oxidation gas supply passage 141, the joint portion joining with a later-described oxidation gas bypass passage 450 connected to the oxidation gas supply passage 141.

The exhaust gas system 400 includes an exhaust gas passage 410, a pressure-regulating valve 420, the fuel gas discharge passage 430, the purge valve 440, and the oxidation gas bypass passage 450. The exhaust gas passage 410 is a passage for discharging the cathode offgas from the fuel cell 100. The pressure-regulating valve 420 is provided in the exhaust gas passage 410 to regulate the pressure of the oxidation gas in the fuel cell 100. The fuel gas discharge passage 430 connects between the gas-liquid separator 129 and the exhaust gas passage 410. The fuel gas discharge passage 430 is equipped with the purge valve 440. When nitrogen concentration in the anode offgas becomes high, or when the amount of the water in the gas-liquid separator 129 increases, the control unit 200 opens the purge valve 440 to discharge water and gas from the gas-liquid separator 129. As a result, the concentration of the impurities in the fuel gas circulating through the passage is reduced as described before. The fuel gas discharge passage 430 is connected to the exhaust gas passage 410 in a region downstream from the pressure-regulating valve 420. The hydrogen in the anode offgas discharged through the purge valve 440 is diluted with the cathode offgas prior to atmospheric emission.

The oxidation gas bypass passage 450 connects between the oxidation gas supply passage 141 and the exhaust gas passage 410. The aforementioned flow dividing valve 144 is provided in a joint portion between the oxidation gas bypass passage 450 and the oxidation gas supply passage 141.

The cooling system 500 includes a coolant supply passage 510, a coolant discharge passage 515, a coolant pump 525, and a radiator 530. The coolant supply passage 510 is adapted to supply coolant to the fuel cell 100. In the coolant supply passage 510, the coolant pump 525 for regulating the flow rate of the coolant flowing through the passage is disposed. The coolant discharge passage 515 is adapted to discharge the coolant from the fuel cell 100. The radiator 530 for cooling the coolant is provided between a downstream portion of the coolant discharge passage 515 and an upstream portion of the coolant supply passage 510. The radiator 530 is equipped with a radiator fan 535. The radiator 530 cools the coolant using a wind sent from the radiator fan 535, and a running wind of the fuel cell vehicle 20.

The electric power circuit 600 includes the fuel cell 100 as a component member of the fuel cell system 30, an FC boost converter 605 (FDC 605), an inverter 610, a battery converter 630, and a secondary battery 650. The electric power circuit 600 is connected to various auxiliaries including the drive motor 170.

The FC boost converter 605 is a DC-DC converter which boosts an output voltage of the fuel cell 100 to high voltage usable in the drive motor 170. The inverter 610 converts the direct current voltage boosted by the FC boost converter 605 into alternating voltage, and supplies the alternating voltage to the drive motor 170. The drive motor 170 is adapted to drive wheels of the vehicle. When the vehicle decelerates, the drive motor 170 performs regenerative operation to generate regenerative electric power.

The battery converter 630 is a bidirectional DC-DC converter. The battery converter 630 steps down the voltage boosted by the FC boost converter 605 or the voltage generated by the regenerative operation of the drive motor 170, and supplies the stepped-down voltage to the secondary battery 650. Alternatively, the battery converter 630 boosts the voltage of the secondary battery 650 and supplies the boosted voltage to the inverter 610. The secondary battery 650 can store the electric power generated by the fuel cell 100, or the regenerative electric power from the drive motor 170. The secondary battery 650 functions as a power source which supplies electric power to load including the drive motor 170. For example, the secondary battery 650 may be constituted of a lithium ion battery, a nickel-hydrogen battery, or the like. The secondary battery 650 may be a chargeable and dischargeable electric storage device. Such an electric storage device may be constituted of, for example, a capacitor instead of the secondary battery. The secondary battery 650 is equipped with a battery sensor 655 for detecting operating states, such as voltage, current, and a state of charge (SOC) of the secondary battery 650.

The control unit 200 is constituted of a microcomputer including a CPU, a ROM, a RAM, and an input-output port. The control unit 200 controls power generation of the fuel cell system 30, and also controls the entire fuel cell vehicle 20 including the electric power circuit 600. The control unit 200 acquires output signals from sensors (including sensors provided in respective units of the fuel cell system 30, an accelerator operation amount sensor, a shift position sensor, an ambient temperature sensor, and a vehicle speed sensor) provided in the respective units of the fuel cell vehicle 20. The control unit 200 outputs to the units drive signals relating to electric power generation, travel, and the like in the fuel cell vehicle 20. The control unit 200 which serves the above-stated function does not need to be constituted as a single control unit. For example, the control unit 200 may be constituted of a plurality of control units, such as a control unit relating to the operation of the fuel cell system 30, a control unit relating to travel of the fuel cell vehicle 20, and a control unit for controlling vehicle auxiliaries irrelevant to travel, and may exchange necessary information among these control units.

Figure 2:
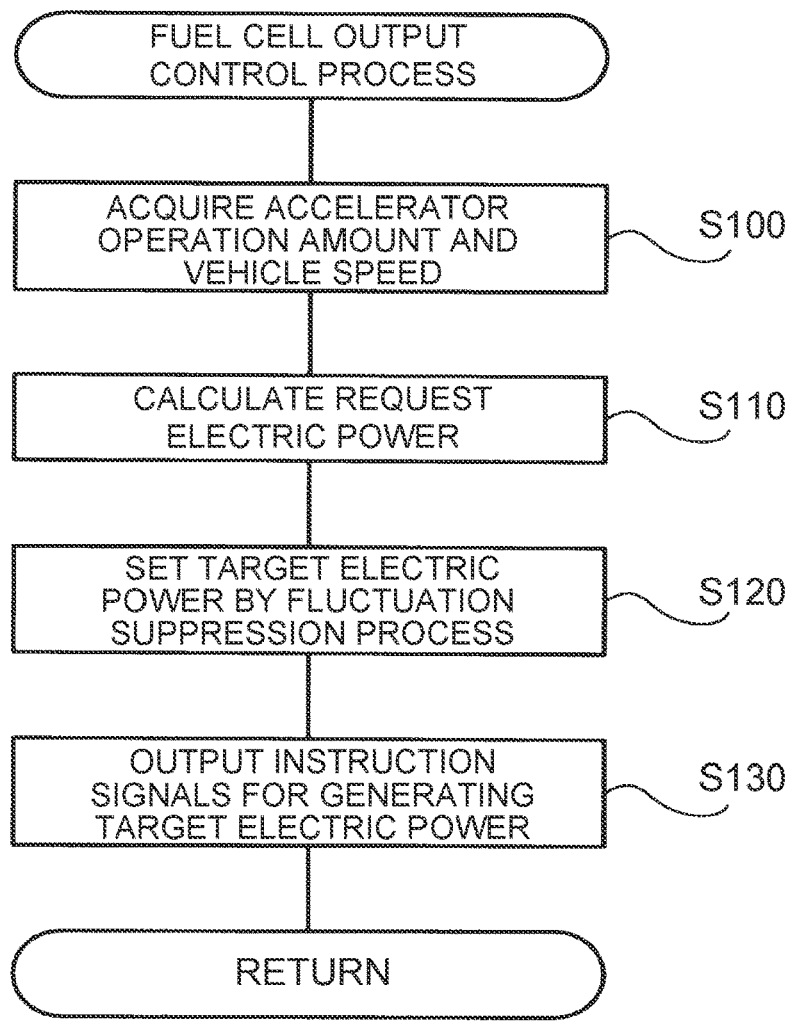
FIG. 2 is a flowchart showing a fuel cell output control process routine.

A-2 Control of Target Electric Power:

FIG. 2 is a flowchart showing a fuel cell output control process routine executed by the CPU in the control unit 200 of the fuel cell vehicle 20. The routine is activated when an instruction for starting the fuel cell system 30 to enable travel of the fuel cell vehicle 20 is input, that is, when a driver presses a start switch (not shown) to be specific. The routine is repeatedly executed until a stop instruction is input (for example, until a start switch is turned off).

When the routine is activated, the CPU of the control unit 200 acquires an accelerator operation amount and a vehicle speed from the accelerator operation amount sensor and the vehicle speed sensor (step S100). The CPU of the control unit 200 calculates request electric power requested to the fuel cell 100 using the acquired accelerator operation amount and vehicle speed (step S110). Then, the CPU of the control unit 200 sets target electric power to be generated by the fuel cell 100 using the request electric power calculated in step S110 (step S120). In step S120, the CPU of the control unit 200 executes a fluctuation suppression process for making a fluctuation of the target electric power smaller than a fluctuation of the request electric power. The fluctuation suppression process will be described in detail later.

When the target electric power is set in step S120, the CPU of the control unit 200 controls electric power generation such that the fuel cell 100 generates the target electric power. Specifically, the CPU of the control unit 200 outputs to the respective units instruction signals for enabling the fuel cell 100 to generate the target electric power (step S130), and ends the routine. More specifically, the CPU of the control unit 200 controls the units of the fuel gas supply system 120 and the oxidation gas supply system 140 such that the amounts of fuel gas and oxidation gas that enable the fuel cell 100 to generate the target electric power are supplied to the fuel cell 100. The control unit 200 also controls the FC boost converter 605, the inverter 610, and the battery converter 630.

Figure 3:
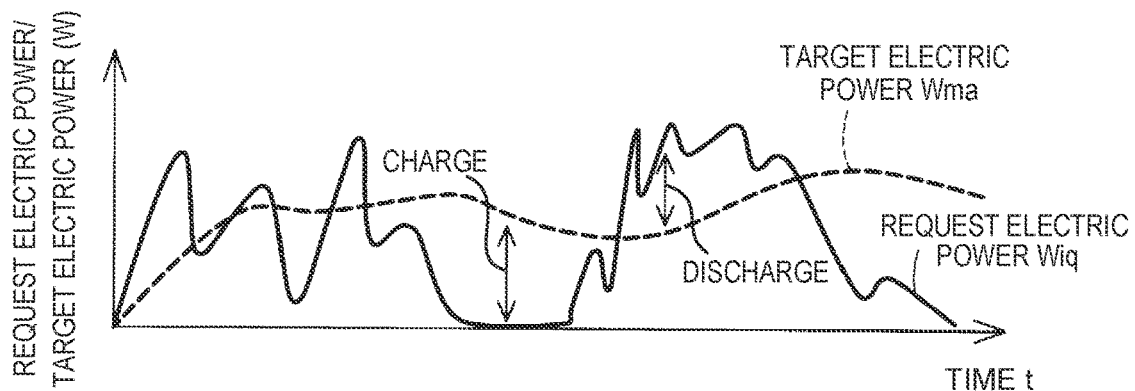
FIG. 3 is an explanatory view schematically showing temporal change in request electric power and target electric power.

FIG. 3 is an explanatory view schematically showing an example of temporal change in request electric power and target electric power. In FIG. 3, a solid line represents request electric power Wiq, and a broken line represents target electric power Wma. As described before, at the time of setting the target electric power Wma using the request electric power Wiq, a fluctuation of the target electric power Wma is made smaller than a fluctuation of the request electric power Wiq by the fluctuation suppression process. Accordingly, the target electric power Wma more gradually fluctuates than the request electric power Wiq. Here, a phrase "the fluctuation of the target electric power Wma is smaller than the fluctuation of the request electric power Wiq" refers to the situation where, when the fuel cell output control process routine is repeatedly executed as described before, an average of differences between the target electric power set in step S120 and the target electric power set in previous step S120 is smaller than an average of differences between the request electric power calculated in step S110 and the request electric power calculated in previous step S110 over the period when the fluctuation suppression process is performed.

As shown in FIG. 3, when the state of a relatively large request electric power Wiq changes to the state of a relatively small request electric power Wiq, the target electric power Wma becomes larger than the request electric power Wiq. As a consequence, the electric power generated more than the request electric power Wiq by the fuel cell 100 may be charged to the secondary battery 650. When the state of a relatively small request electric power Wiq changes to the state of a relatively large request electric power Wiq, the target electric power Wma becomes smaller than the request electric power Wiq. As a consequence, the fuel cell 100 may fail to supply sufficient electric power for the request electric power Wiq, and the insufficient part of the electric power may be provided by discharge from the secondary battery 650. Hereinafter, examples of the process adoptable as the fluctuation suppression process will be described.

Figure 4:
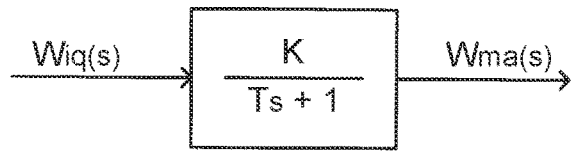
FIG. 4 is a conceptual view showing a transfer function of a primary-delay low pass filter.

A-3 Low Pass Filter Process:

FIG. 4 is a conceptual view showing a transfer function of a primary-delay low pass filter. In FIG. 4, T is a time constant. In a low pass filter process, as the time constant is set larger, the level of making the fluctuation of the target electric power smaller than the fluctuation of the request electric power can be increased. For example, the time constant may be set to 10 seconds or more, may preferably be set to 60 seconds or more, may more preferably be set to 120 seconds or more, and may still more preferably be set to 180 seconds or more. The time constant may also be set to, for example, 500 seconds or less, and may preferably be set to 400 seconds or less. In the present embodiment, the time constant is set to 300 seconds, for example. As the low pass filter process, various smoothing aspects may be adopted. Hereinafter, specific examples of the low pass filter process will be described.

Figure 5:
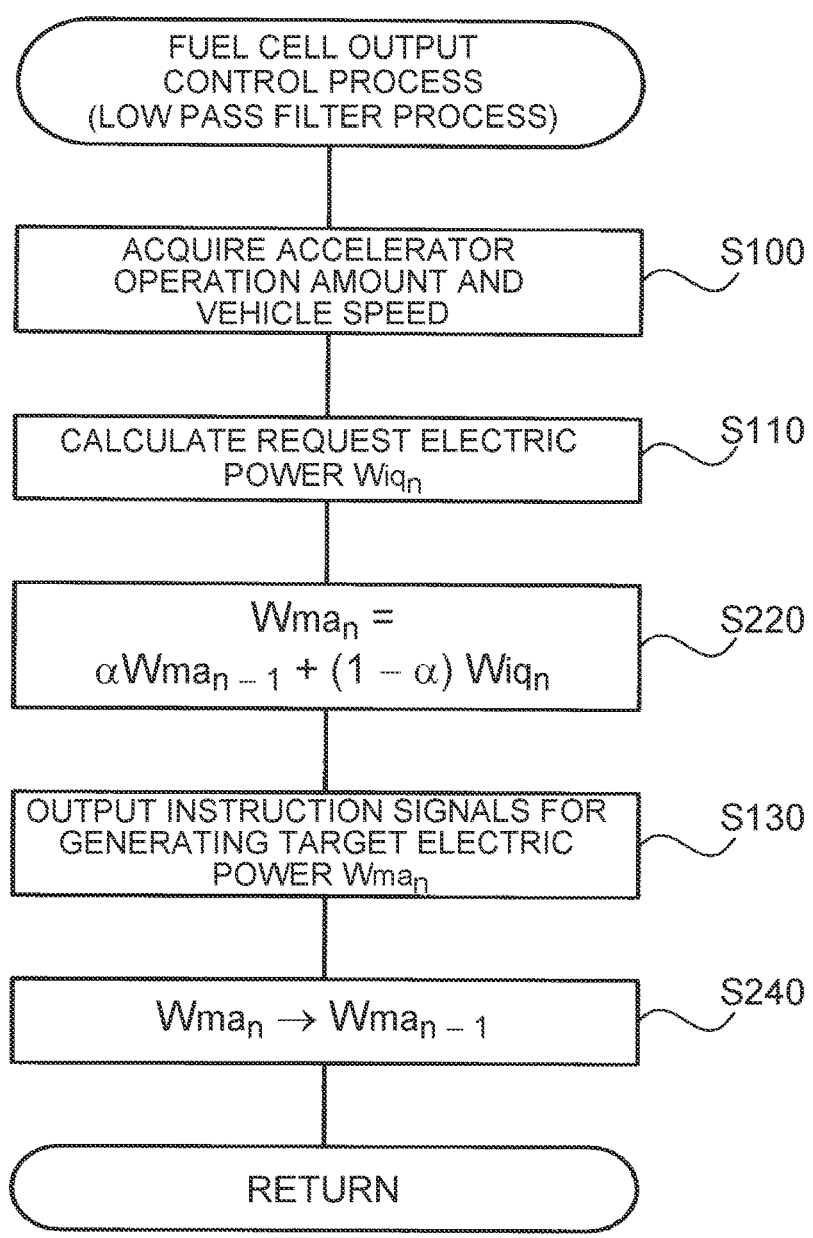
FIG. 5 is a flowchart showing another fuel cell output control process routine.

FIG. 5 is a flowchart showing, as in FIG. 2, the fuel cell output control process routine in the case of performing the low pass filter process as the fluctuation suppression process for setting the target electric power Wma by applying a low pass filter to the fluctuation of the request electric power Wiq. In FIG. 5, the operation similar to that in FIG. 2 is designated by the similar step number. Step S220 of FIG. 5 corresponds to operation of step S120 involving the fluctuation suppression process.

FIG. 5 shows an example of calculating the target electric power $Wma_n$ with a following expression (1) as an example of the low pass filter process serving as the fluctuation suppression process (step S220):

$$Wma_n = \alpha Wma_{n-1} + (1-\alpha) Wiq_n \text{ (where } 0<\alpha<1) \quad (1)$$

In the expression (1), $Wiq_n$ is request electric power $Wiq_n$ calculated in step S110. $Wma_{n-1}$ is a value of target electric power $wma_n$ calculated in previous step S220, when the fuel cell output control process routine of FIG. 5 is previously performed as described later. As the value of a coefficient $\alpha$ in the range of $0<\alpha<1$ is larger, an influence of the fluctuation of the request electric power $Wiq_n$ on the target electric power $wma_n$ can be reduced more, and the level of making the fluctuation of the target electric power smaller than the fluctuation of request electric power can be increased more. The CPU of the control unit 200 calculates the target electric power $wma_n$ in step S220, and outputs instruction signals to the units of the fuel cell system 30 in step S130. Then, the CPU of the control unit 200 changes the target electric power $wma_n$ calculated in step S220 to $Wma_{n-1}$ (step S240), and ends the routine.

In the operation shown in FIG. 5, the time constant can optionally be set with the value of a and a sampling frequency (time interval for executing the routine of FIG. 5). As the value of a becomes larger, and the time interval for executing the routine is longer, the time constant becomes larger.

Figure 6:
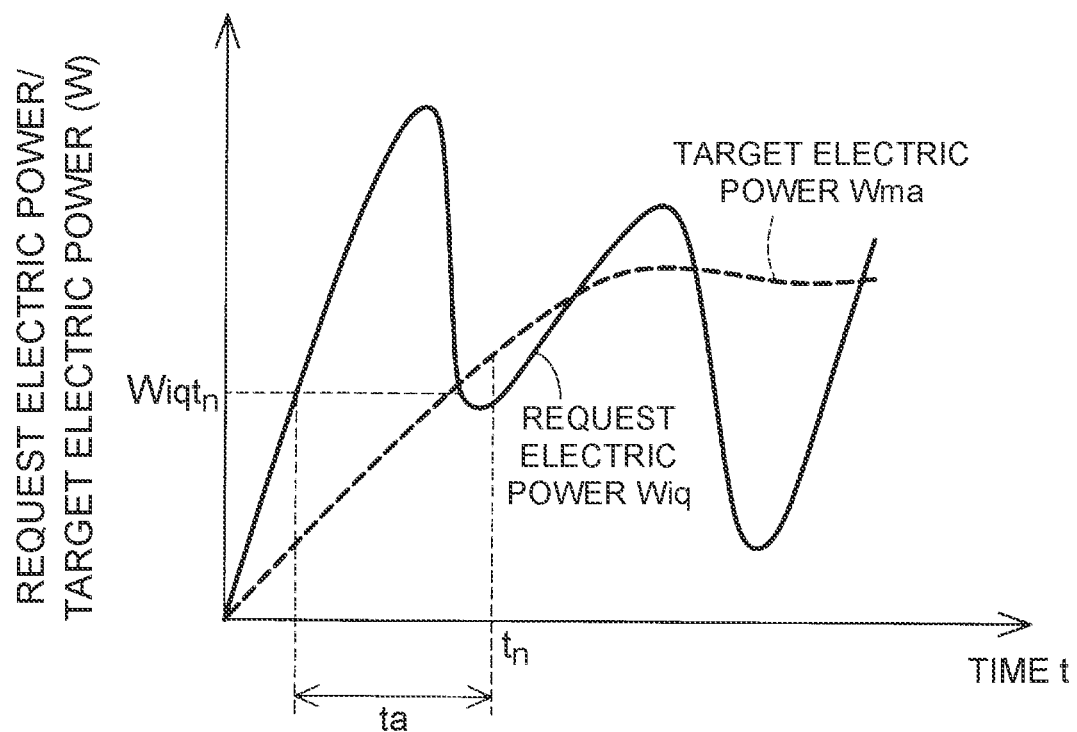
FIG. 6 is an explanatory view of an equalization process.

A-4 Equalization Process:

FIG. 6 is an explanatory view about an equalization process as another example of the fluctuation suppression process. In the equalization process, a representative value, among the values each including target electric power Wma repeatedly set in the process shown in FIG. 2 during a period from a time point t1, tracing back for a predetermined reference period ta from a time point tn that is present time, to the present time tn, and the request electric power $Wiqt_n$ at the present time, is set as the target electric power $Wmat_n$ at time point tn. As the representative value, a mean value, a medium value, and a mode value can be used, for example. In the following example, a mean value is used as the representative value. When the mean value is used as the representative value, the target electric power $Wmat_n$ at time point tn can be expressed by a following expressions (2). The expression (2) expresses the case where the operation of setting the target electric power Wma is performed (n−1) times during a period from the time point t1 to the present time tn.

$$Wmat_n = (Wmat_1 + Wmat_2 + \ldots + Wmat_{n-1} + Wiqt_n)/n \quad (2)$$

In the equalization processing shown in the expression (2), a representative value, among the values each including target electric power Wma set during a period from the time point t1 tracing back for the predetermined reference period ta from the present time tn to the present time tn (to the time point when the target electric power Wma is previously set), and request electric power $Wiqt_n$ at the present time, is set as the target electric power $Wmat_n$. However, different configuration may be adopted. For example, a representative value, among the values each including request electric power Wiq calculated during a period from the time point t1 tracing back for the predetermined reference period to from the present time tn to the present time tn (to the time point when the target electric power Wma is previously set), and the request electric power $Wiqt_n$ at the present time, is set as the target electric power $Wmat_n$. In such calculation of the target electric power $Wmat_n$, a mean value is used as the representative value as expressed by an expression (3) shown below:

$$Wmat_n = (Wiqt_1 + Wiqt_2 + \ldots + Wiqt_{n-1} + Wiqt_n)/n \quad (3)$$

Figure 7:
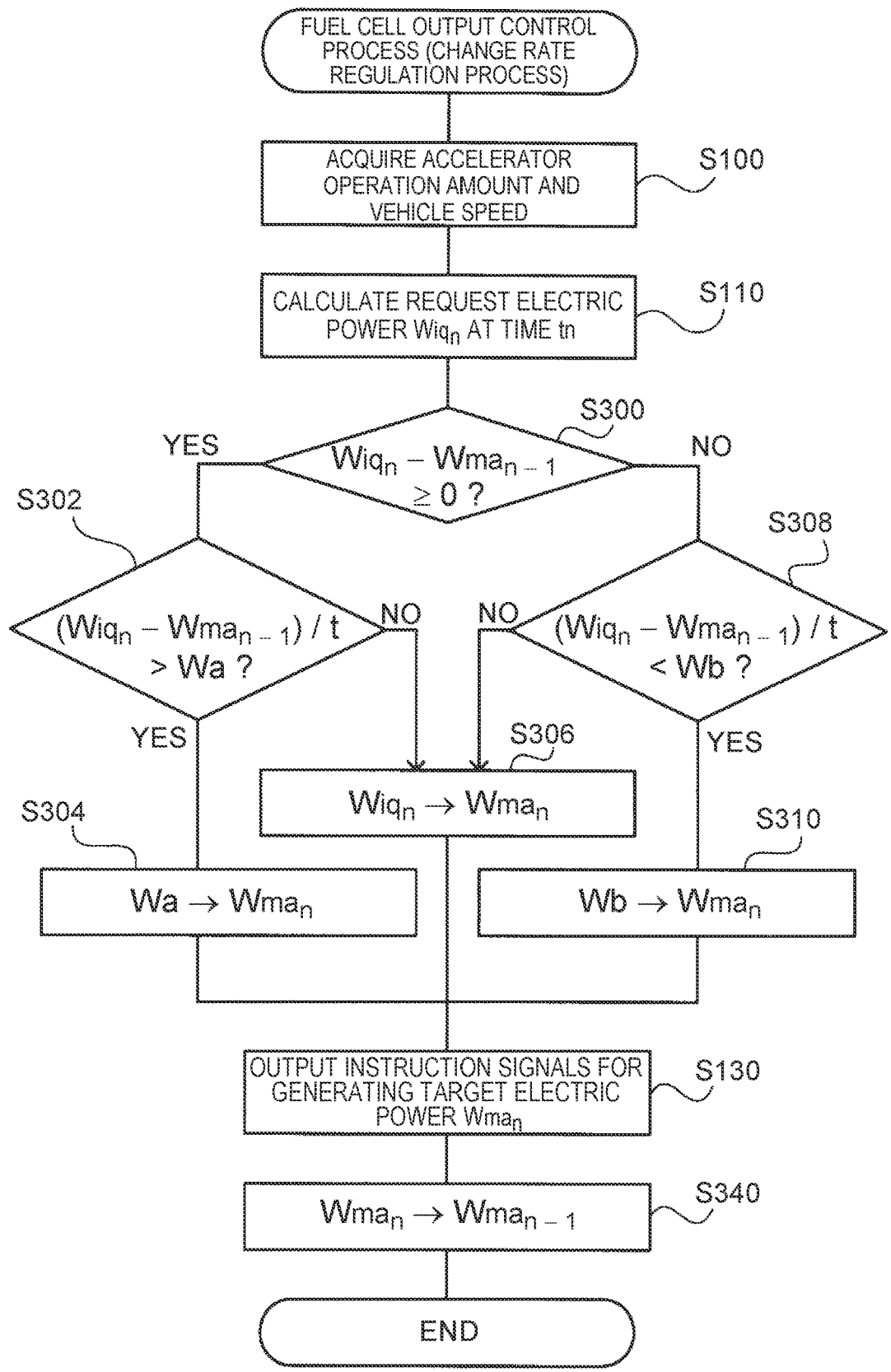
FIG. 7 is a flowchart showing another fuel cell output control process routine.

A-5 Change Rate Regulation Process:

FIG. 7 is a flowchart showing, as in FIG. 2, the fuel cell output control process routine in the case of performing a change rate regulation process as another example of the fluctuation suppression process. In FIG. 7, the operations similar to the operation in FIG. 2 are designated by the similar step number. Steps S300 to S310 of FIG. 7 correspond to the operation of step S120 involving the fluctuation suppression process.

In the case of executing the change rate regulation process as the fluctuation suppression process, the CPU of the control unit 200 calculates request electric power $Wiq_n$ at the present time (time point tn) in step S110. The CPU of the control unit 200 then compares a difference between the request electric power $Wiq_n$ and the target electric power $Wma_{n-1}$ that is set as the target electric power $wma_n$ in previous step S120 (in one of the steps S304, S306, S310 described later) with zero (step S300). When the difference is zero or more (step S300: YES), that is, when the request electric power $Wiq_n$ is larger than or equal to the previous target electric power $Wma_{n-1}$, the CPU of the control unit 200 compares a change amount (increment) of the difference between the request electric power $Wiq_n$ and the previous target electric power $Wma_{n-1}$ per unit time with a predetermined upper limit Wa of the increment of the target electric power per unit time (step S302).

When the change amount of the difference between the request electric power $Wiq_n$ and the previous target electric power $Wma_{n-1}$ per unit time exceeds the upper limit Wa (step S302: YES), the CPU of the control unit 200 sets the upper limit Wa to the target electric power $wma_n$ at time point tn (step S304). When the change amount of the difference between the request electric power $Wiq_n$ and the previous target electric power $Wma_{n-1}$ per unit time is the upper limit Wa or less (step S302: NO), the CPU of the control unit 200 sets the request electric power $Wiq_n$ to the target electric power $wma_n$ at time point tn (step S306).

When the difference between the request electric power $Wiq_n$ and the previous target electric power $Wma_{n-1}$ is less than zero in step S300 (step S300: NO), that is, when the request electric power $Wiq_n$ decreases from the previous target electric power $Wma_{n-1}$, the CPU of the control unit 200 compares a change amount of the difference between the request electric power $Wiq_n$ and the previous target electric power $Wma_{n-1}$ (decrement) per unit time with a predetermined lower limit Wb of the decrement of the target electric power per unit time (step S308). When the change amount of the difference between the request electric power $Wiq_n$ and the previous target electric power $Wma_{n-1}$ per unit time is the lower limit Wb or less (step S308: NO), the CPU of the control unit 200 sets the request electric power $Wiq_n$ to the target electric power $wma_n$ at time point tn (step S306). When the change amount of the difference between the request electric power $Wiq_n$ and the previous target electric power $Wma_{n-1}$ per unit time exceeds the lower limit Wb (step S308: YES), the CPU of the control unit 200 sets the lower limit Wb to the target electric power $wma_n$ at time point tn (step S310).

The CPU of the control unit 200 sets the target electric power $wma_n$ in any one of steps S304, S306, S310, and outputs instruction signals to the respective units of the fuel cell system 30 in step S130. Then, the CPU of the control unit 200 changes the target electric power $wma_n$ calculated in any one of steps S304, S306, S310 to $Wma_{n-1}$ (step S340), and ends the routine.

According to the configuration, even when the request electric power Wiq largely fluctuates, the change amount of the difference between the request electric power $Wiq_n$ and the previous target electric power $Wma_{n-1}$ per unit time is maintained in the range of the lower limit Wb to the upper limit Wa. Accordingly, when the request electric power Wiq fluctuates, the fluctuation of the target electric power Wma is made smaller than the fluctuation of the request electric power Wiq as a whole.

Figure 8:
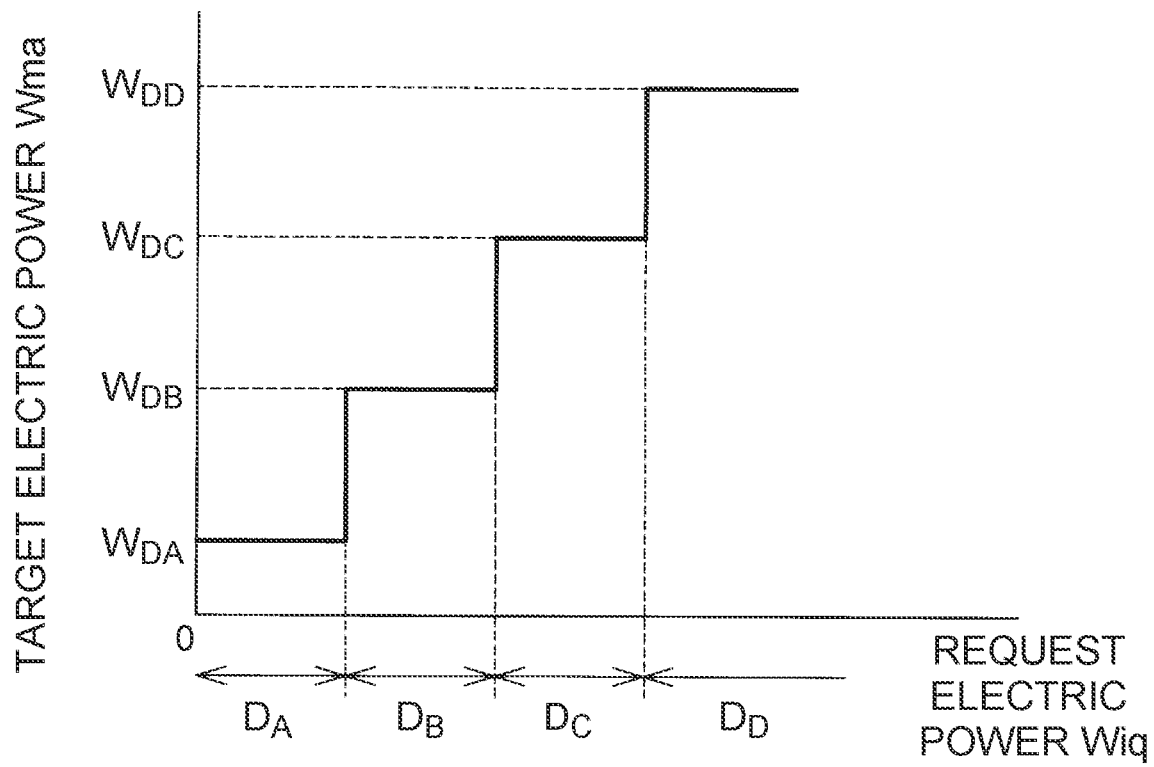
FIG. 8 is an explanatory view of a staged process.

A-6 Staged Process:

FIG. 8 is an explanatory view of a staged process as another example of the fluctuation suppression process. In the staged process, an allowable range of the request electric power Wiq is divided into a plurality of divided ranges. In accordance with increase in the request electric power Wiq, the target electric power Wma is increased in stages such that when the request electric power Wiq belongs to an identical divided range, identical target electric power Wma is set. In FIG. 8, in the divided ranges $D_A$, $D_B$, $D_C$, $D_D$ of the request electric power Wiq, $W_{DA}$, $W_{DB}$, $W_{DC}$, $W_{DD}$ are set as the target electric power Wma, respectively. A map indicating the relationship between the request electric power Wiq and the target electric power Wma as shown in FIG. 8 may be stored in the memory of the control unit 200 in advance. The target electric power Wma may be set with reference to the map in step S120.

According to the configuration, even in the case where the request electric power Wiq fluctuates, identical target electric power Wma is set when the request electric power Wiq fluctuates in the identical divided range. As a result, the fluctuation of the target electric power Wma is made smaller than the fluctuation of the request electric power Wiq as a whole. In the map of FIG. 8, hunching can be restrained by providing hysteresis.

In the fuel cell system 30 of the present embodiment, when the fuel cell 100 generates electric power in response to a load request, that is, when control is performed to set the target electric power Wma using the request electric power Wiq to be specific, one of the fluctuation suppression processes is continuously executed. However, an operation mode in which no fluctuation suppression process is performed may further be provided. The operation mode may be configured such that electric power generation by the fuel cell 100 may be stopped regardless of a load request under certain conditions, or the target electric power Wma of the fuel cell 100 may be set to a specific value without using the request electric power Wiq.

According to the thus-configured fuel cell system 30 of the present embodiment, at the time of setting the target electric power Wma using the request electric power Wiq that is requested to the fuel cell 100, the fluctuation suppression process for making the fluctuation of the target electric power Wma smaller than the fluctuation of the request electric power Wiq is executed. This makes it possible to restrain the inconvenience attributed to the fluctuation in electric power generation amount of the fuel cell 100 relating to the fluctuation of the request electric power. Examples of the inconvenience attributed to the fluctuation in electric power generation amount of the fuel cell 100 may include an inconvenience that a catalyst included in the electrode gradually deteriorates due to fluctuation of electrode potential of the fuel cell 100 attributed to fluctuation of the electric power generation amount of the fuel cell 100. Examples of the inconvenience also include an inconvenience that a polymer electrolyte, resin as adhesives, or the like, used for a membrane electrode assembly included in each of the single cells of the fuel cell 100 is repeatedly wetted and dried due to fluctuation of the electric power generation amount of the fuel cell 100, and thereby gradually deteriorates. Alternatively, examples of the inconvenience also include an inconvenience that as the electric power generation amount of the fuel cell 100 fluctuates, the speed of auxiliaries, such as pumps for supplying reactant gas to the fuel cell 100 (for example, the circulation pump 127 and the compressor 130, or the coolant pump 525, and the radiator fan 535 shown in FIG. 1), fluctuates, and the durability of these auxiliaries gradually deteriorates. The present embodiment can restrain such inconvenience.

B. Second Embodiment

Figure 9:
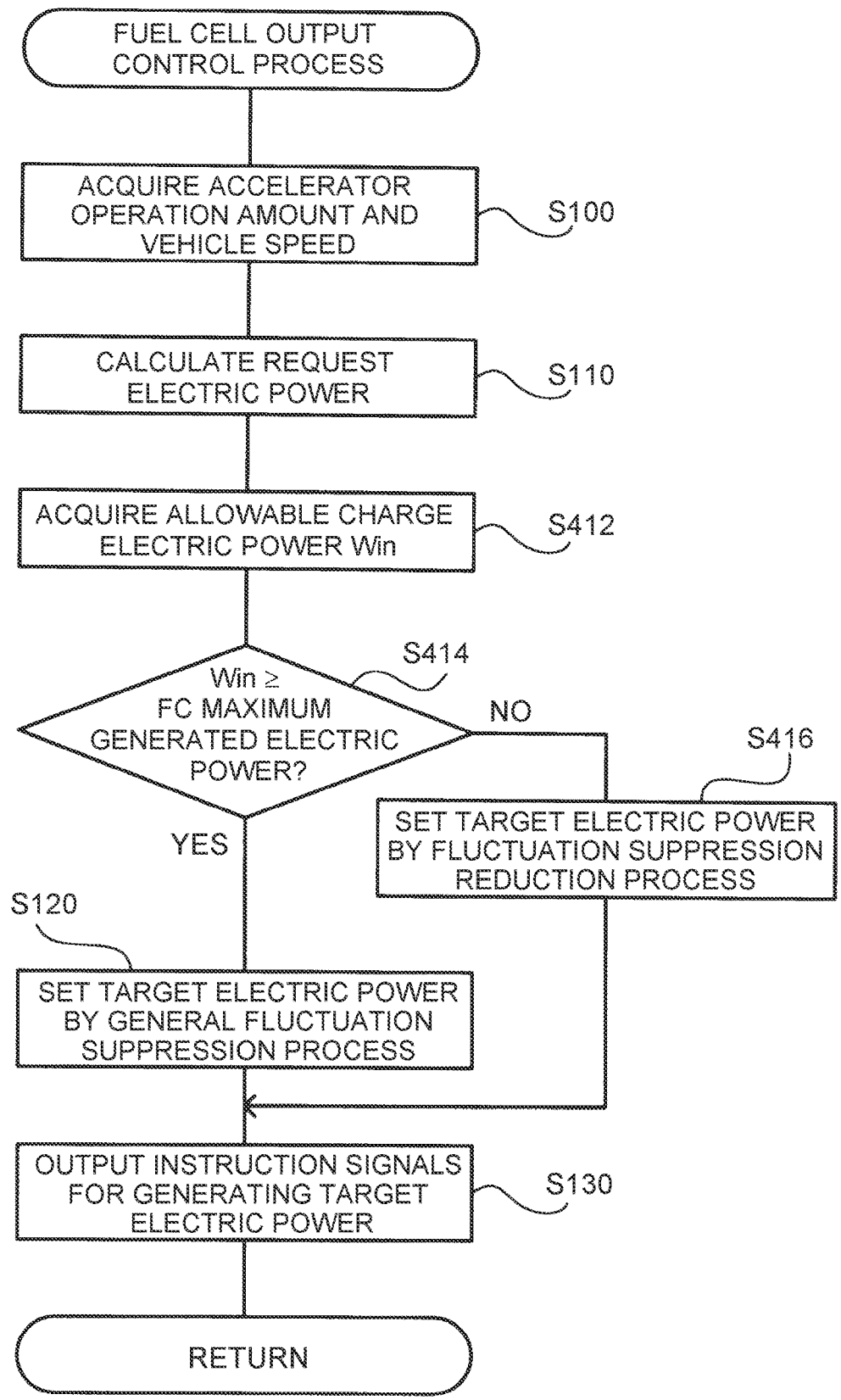
FIG. 9 is a flowchart showing another fuel cell output control process routine.

B-1 Control of Target Electric Power:

FIG. 9 is a flowchart showing a fuel cell output control process routine executed in the control unit 200 of the fuel cell system 30 as a second embodiment of the present disclosure, in place of the control process of the first embodiment shown in FIG. 2.

The fuel cell system 30 of the second embodiment includes the same configuration as in the first embodiment. In FIG. 9, the processes similar to those in FIG. 2 are designated by the similar step numbers.

In the second embodiment, the CPU of the control unit 200 calculates request electric power in step S110, and then acquires allowable charge electric power Win (step S412). The allowable charge electric power Win is a value determined as an upper limit of charge electric power of the secondary battery 650, the value indicating charging performance of the secondary battery 650. As the allowable charge electric power Win is larger, it indicates that the charging performance is higher, and more electric power can be charged. The allowable charge electric power Win is a value determined based on the state of charge (SOC) of the secondary battery 650 and the temperature of the secondary battery 650. The relationship between the allowable charge electric power Win, and the state of charge and temperature of the secondary battery 650 is predetermined for every fuel cell 100. A map indicating the relationship is stored in the memory of the control unit 200 in advance. In step S412, the CPU of the control unit 200 acquires the state of charge of the secondary battery 650 from the battery sensor 655, and also acquires the temperature of the secondary battery 650 from an unillustrated temperature sensor. With reference to the map, the CPU of the control unit 200 acquires the allowable charge electric power Win.

When the allowable charge electric power Win is acquired in step S412, the CPU of the control unit 200 compares the allowable charge electric power Win with maximum generated electric power (also called FC maximum generated electric power) of the fuel cell (step S414). The FC maximum generated electric power is a maximum value of the electric power which can be generated by the fuel cell 100. The FC maximum generated electric power is predetermined for every fuel cell 100 and is stored in the memory of the control unit 200. The FC maximum generated electric power used in step S414 may also be a predetermined specific value like a catalog value. Alternatively, the FC maximum generated electric power may be a value corrected based on the current state of the fuel cell 100 in consideration of the fuel cell temperature, or the like, which influences the electric power generation performance of the fuel cell 100.

In step S414, when determining that the allowable charge electric power Win is equal to or greater than the FC maximum generated electric power (step S414: YES), the CPU of the control unit 200 sets the target electric power Wma by a general fluctuation suppression process similar to that in the first embodiment (step S120).

When determining that the allowable charge electric power Win is less than the FC maximum generated electric power in step S414 (step S414: NO), the CPU of the control unit 200 sets the target electric power by performing a process (hereinafter also called a fluctuation suppression reduction process) which reduces the level of making a fluctuation of the target electric power smaller than a fluctuation of the request electric power at the time of performing the fluctuation suppression process, such that the level becomes lower than the level when the allowable charge electric power Win exceeds the FC maximum generated electric power (step S416). In step S416, the level of making the fluctuation of the target electric power smaller than the fluctuation of the request electric power is reduced. Accordingly, as compared with the fluctuation suppression process of step S120, the degree of the target electric power and the generated electric power of the fuel cell 100 following the request electric power increases. At the time, the CPU of the control unit 200 functions as a "fluctuation suppression reduction unit" which reduces the level of making the fluctuation of the target electric power smaller than the fluctuation of the request electric power, in accordance with the operating state of the fuel cell system 30. In the second embodiment, the "operating state of the fuel cell system 30" is defined as the allowable charge electric power Win. When the target electric power is set in step S120 or step S416, the CPU of the control unit 200 outputs the instruction signals for generating target electric power (step S130), and ends the present routine. Hereinafter, the operation in step S416 by the fluctuation suppression reduction unit will specifically be described for each of the aforementioned examples of the fluctuation suppression process.

B-2 Operation of Fluctuation Suppression Reduction Unit:

When the fluctuation suppression process is the low pass filter process, the level of making the fluctuation of the target electric power smaller than the fluctuation of the request electric power may be reduced by shortening the time constant in the low pass filter process in step S416.

When the fluctuation suppression process is the equalization process, the reference period to shown in FIG. 6 may be changed to be shorter in step S416. Changing the reference period ta to be shorter means that at the time of setting the target electric power, a period tracking back to the past for equalization becomes shorter. Accordingly, when the reference period ta is shortened, the target electric power can easily follow the request electric power. Hence, the level of making the fluctuation of the target electric power smaller than the fluctuation of the request electric power is reduced.

When the change rate regulation process is the fluctuation suppression process, the upper limit Wa of the change amount of the difference between the request electric power $Wiq_n$ and the previous target electric power $Wma_{n-1}$ per unit time may be increased in step S416, while the lower limit Wb of the change amount of the difference per unit time may be decreased. As a result, the target electric power can easily follow the request electric power, and the level of making the fluctuation of the target electric power smaller than the fluctuation of the request electric power is reduced.

When the fluctuation suppression process is the staged process, the number of divided ranges shown in FIG. 8 may be increased in step S416. The control unit 200 may prestore a plurality of maps that are different in number of divided ranges as the map which indicates as in FIG. 8, the relationship that the target electric power increases in stages in accordance with the increase in request electric power. In step S416, the map to be used is changed to the map having more divided ranges, and the fluctuation suppression process may be executed. As the number of the divided ranges is increased, the target electric power can easily follow the request electric power. Hence, the level of making the fluctuation of the target electric power smaller than the fluctuation of the request electric power is reduced.

Such configuration can restrain the secondary battery 650 from being overcharged, and restrain the secondary battery 650 from deteriorating due to an overcharge. If the fuel cell 100 generates the FC maximum generated electric power as a result of the fluctuation suppression process although the allowable charge electric power Win is less than the FC maximum generated electric power, and so the request electric power at that time becomes practically zero, that is, when the state of considerably large request electric power continues, and then the state suddenly changes to the state of considerably small request electric power, then there is a possibility that the generated electric power of the fuel cell 100 may exceed the allowable charge electric power Win of the secondary battery 650. When the generated electric power of the fuel cell 100 exceeds the allowable charge electric power Win, an overcharge of the secondary battery 650 may occur. That is the scenario when a worst-case condition is assumed. When the allowable charge electric power Win is less than the FC maximum generated electric power, the level of making the fluctuation of the target electric power smaller than the fluctuation of the request electric power may be reduced, and thereby the degree that the target electric power follows the request electric power may be increased. This makes it possible to restrain occurrence of the overcharge. The control of the present embodiment can be defined as control for restraining an overcharge of the secondary battery 650 when there is an increased possibility of the deterioration of the secondary battery 650 attributed to the overcharge, in priority to restraining deterioration, or the like, of the units of the fuel cell system 30 attributed to fluctuation of the request electric power.

The level of reducing fluctuation suppression in step S416 may not constantly be fixed. Rather, the level may be changed in accordance with a difference between the allowable charge electric power Win and the FC maximum generated electric power. In short, as the FC maximum generated electric power is larger than the allowable charge electric power Win, the level of making the fluctuation of the target electric power smaller than the fluctuation of the request electric power may be reduced more. Specifically, for example, as the FC maximum generated electric power is larger than the allowable charge electric power Win, the time constant in the low pass filter process may be decreased more. As the FC maximum generated electric power is larger than the allowable charge electric power Win, the reference period to in the equalization process may be shortened more. As the FC maximum generated electric power is larger than the allowable charge electric power Win, the upper limit Wa in the change rate regulation process may be increased more while the lower limit Wb may be decreased more. Alternatively, as the FC maximum generated electric power is larger than the allowable charge electric power Win, the number of the divided ranges in the staged process may be increased more. As a result, as the FC maximum generated electric power is larger than the allowable charge electric power Win, the level of decreasing the fluctuation suppression is increased more so as to enhance the capability of the target electric power to follow the request electric power.

C. Third Embodiment

Figure 10:
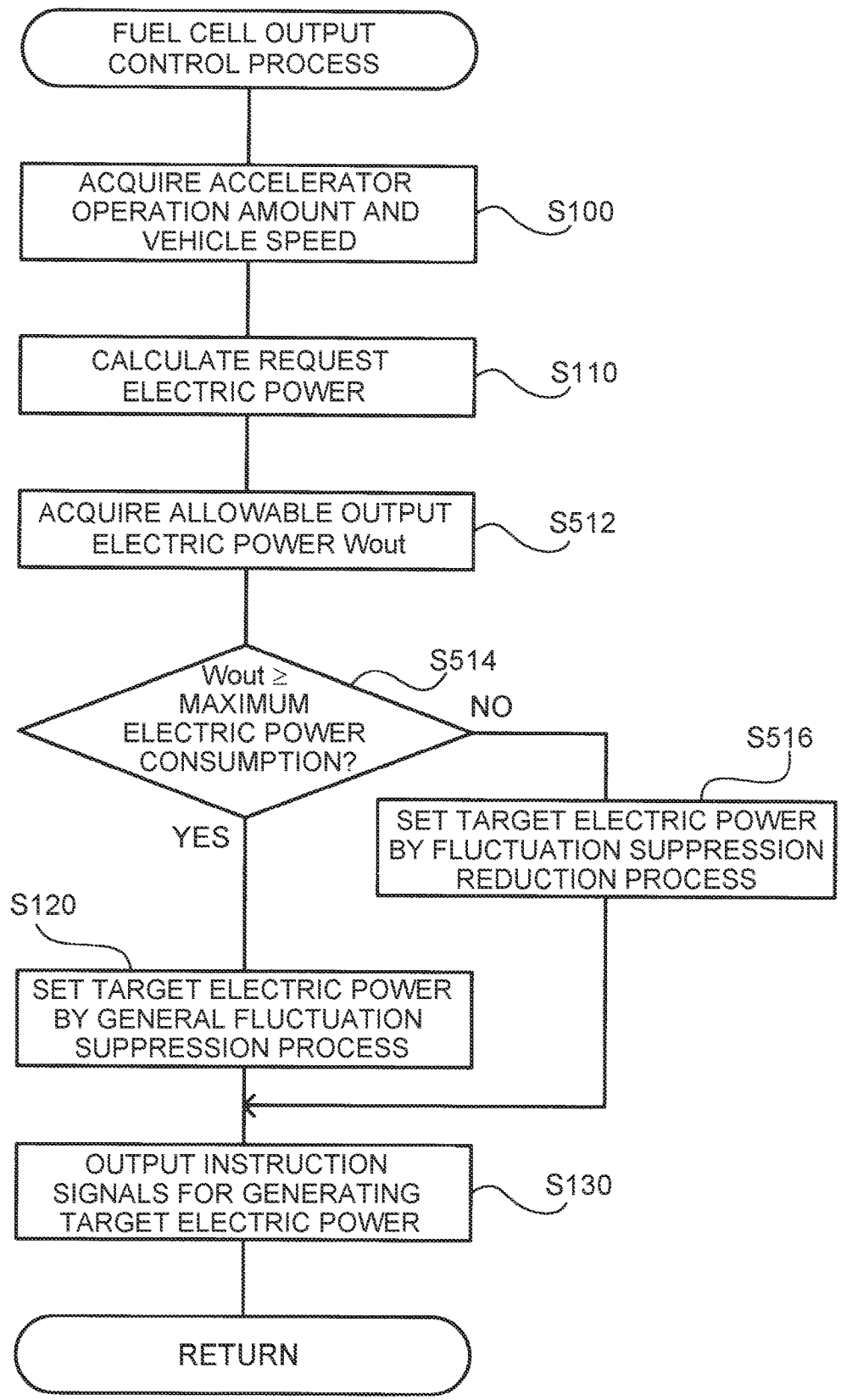
FIG. 10 is a flowchart showing another fuel cell output control process routine.

FIG. 10 is a flowchart showing a fuel cell output control process routine executed in the control unit 200 of the fuel cell system 30 as a third embodiment of the present disclosure, in place of the control process of the first embodiment shown in FIG. 2. The fuel cell system 30 of the third embodiment includes the same configuration as in the first embodiment. In FIG. 10, the processes similar to those in FIG. 2 are designated by the similar step numbers.

In the third embodiment, the CPU of the control unit 200 calculates request electric power in step S110, and then acquires allowable output electric power Wout (step S512). The allowable output electric power Wout is an upper limit of the output electric power of the secondary battery 650. The allowable output electric power Wout is a value indicating discharging performance of the secondary battery 650. As the allowable output electric power Wout is larger, it indicates that the discharging performance is higher, and more electric power can be output. The allowable output electric power Wout is a value determined based on the state of charge (SOC) of the secondary battery 650 and the temperature of the secondary battery 650. The relationship between the allowable output electric power Wout, and the state of charge and temperature of the secondary battery 650 is predetermined for every fuel cell 100. A map indicating the relationship is stored in the memory of the control unit 200 in advance. In step S512, the CPU of the control unit 200 acquires the state of charge of the secondary battery 650 from the battery sensor 655, and also acquires the temperature of the secondary battery 650 from an unillustrated temperature sensor. With reference to the map, the CPU of the control unit 200 acquires the allowable output electric power Wout.

When the allowable output electric power Wout is acquired in step S512, the CPU of the control unit 200 compares the allowable output electric power Wout with maximum electric power consumption in the load (step S514). The maximum electric power consumption in the load can be defined as a maxim value of the electric power consumption in the entire load (for example, the entire fuel cell vehicle 20) which receives electric power supply from the fuel cell system 30. However, since the drive motor 170 of the fuel cell vehicle 20 corresponds to the largest load in the entire load that receives electric power supply from the fuel cell system 30, the maximum electric power consumption in the load may be defined as the maximum value of the electric power consumption in the drive motor 170. Alternatively, the maximum electric power consumption in the load may be set in consideration of the power consumption of the fuel cell auxiliaries or vehicle auxiliaries, in addition to the power consumption of the drive motor 170. The maximum electric power consumption in the load may be predetermined, and be stored in the memory of the control unit 200.

In step S514, when determining that the allowable output electric power Wout is equal to or greater than the maximum electric power consumption (step S514: YES), the CPU of the control unit 200 sets the target electric power by a general fluctuation suppression process similar to that in the first embodiment (step S120).

When determining that the allowable output electric power Wout is less than the maximum electric power consumption in step S514 (step S514: NO), the CPU of the control unit 200 sets the target electric power by performing a fluctuation suppression reduction process which reduces the level of making a fluctuation of the target electric power smaller than a fluctuation of the request electric power at the time of performing the fluctuation suppression process, such that the level becomes lower than the level when the allowable output electric power Wout exceeds the maximum electric power consumption (step S516). Since the operation of step S516 is performed in the same way as the operation of step S416 in the second embodiment, detailed description thereof is omitted.

In step S516, the CPU of the control unit 200 functions as a "fluctuation suppression reduction unit" which reduces the level of making the fluctuation of the target electric power smaller than the fluctuation of the request electric power, in accordance with the operating state of the fuel cell system 30. In the third embodiment, the "operating state of the fuel cell system 30" is defined as the allowable output electric power Wout. When the target electric power is set in step S120 or step S516, the CPU of the control unit 200 outputs the instruction signals for generating target electric power (step S130), and ends the present routine.

Such configuration can restrain the state of charge of the secondary battery 650 from becoming excessively low in the fuel cell system 30. As a result, when the fluctuation suppression process is performed, it is possible to restrain the fuel cell system 30 from failing to supply sufficient electric power for the request electric power, and to restrain deteriorated drivability attributed to the insufficient state of charge of the secondary battery 650. If the output of the fuel cell 100 became practically zero as a result of the fluctuation suppression process, and the request electric power of the load at that time becomes the maximum electric power consumption, although the allowable output electric power Wout is less than the maximum electric power consumption, that is, when the state of considerably small request electric power continues, and then the state suddenly changes to the state of considerably large request electric power, then there is a possibility that practically the entire maximum electric power consumption of the load needs to be supplied from the secondary battery 650. However, since the secondary battery 650 is unable to output more than the allowable output electric power Wout, the load, i.e., the drive motor 170, is unable to receive requested electric power, which may deteriorate the drivability of the fuel cell vehicle 20. That is the scenario when a worst-case condition is assumed. When the allowable output electric power Wout is less than the maximum electric power consumption, the level of making the fluctuation of the target electric power smaller than the fluctuation of the request electric power may be reduced, and thereby the degree that the target electric power follows the request electric power may be increased. This makes it possible to restrain the state of charge of the secondary battery 650 from becoming excessively small. As a result, the deteriorated drivability attributed to the insufficient output from the secondary battery 650 can be restrained. The control of the present embodiment can be defined as control for restraining the insufficient state of charge of the secondary battery 650 when there is an increased possibility of the deteriorated drivability attributed to the insufficient state of charge of the secondary battery 650, in priority to restraining deterioration, or the like, of the units of the fuel cell system 30 attributed to fluctuation of the request electric power.

The level of reducing fluctuation suppression in step S516 may not constantly be fixed. Rather, the level may be changed in accordance with a difference between the allowable output electric power Wout and the maximum electric power consumption. In short, as the maximum electric power consumption is larger than the allowable output electric power Wout, the level of making the fluctuation of the target electric power smaller than the fluctuation of the request electric power may be reduced more. Specific operation for further reducing the level of making the fluctuation of the target electric power smaller than the fluctuation of the request electric power in the fluctuation suppression process may be similar to the operation described in the second embodiment.

D. Fourth Embodiment

Figure 11:
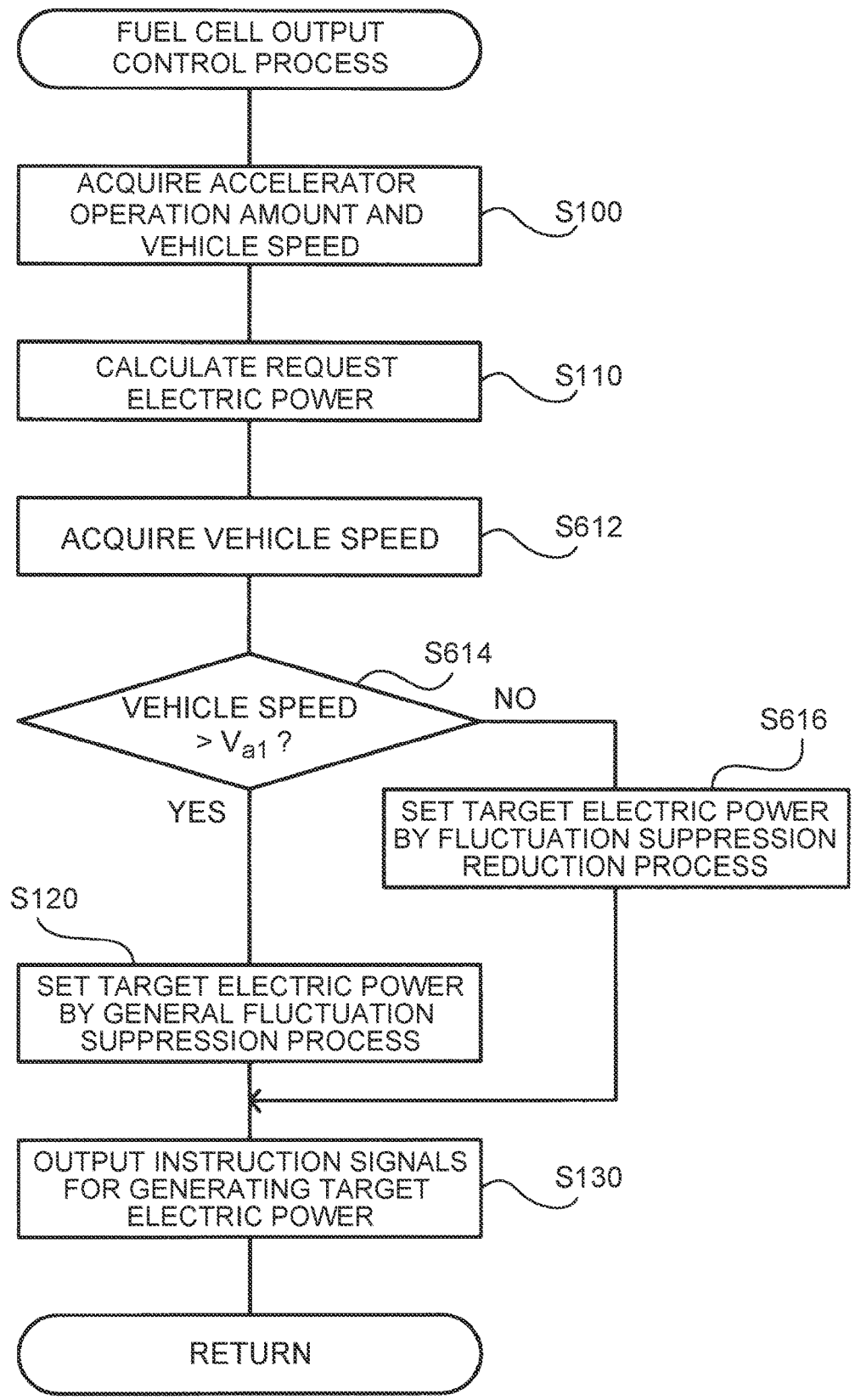
FIG. 11 is a flowchart showing another fuel cell output control process routines.

FIG. 11 is a flowchart showing a fuel cell output control process routine executed in the control unit 200 of the fuel cell system 30 as a fourth embodiment of the present disclosure, in place of the control process of the first embodiment shown in FIG. 2. The fuel cell system 30 of the fourth embodiment includes the same configuration as in the first embodiment. In FIG. 11, the processes similar to those in FIG. 2 are designated by the similar step numbers.

In the fourth embodiment, the CPU of the control unit 200 calculates request electric power in step S110, and then acquires the vehicle speed of the fuel cell vehicle 20 from a vehicle speed sensor (step S612). The CPU of the control unit 200 then compares the acquired vehicle speed with a predetermined first reference value $V_{a1}$ (step S614). The first reference value $V_{a1}$ is preset as a reference value indicating that the fuel cell vehicle 20 is in a stopped state, or in a low-speed traveling state close to the stopped state. The first reference value $V_{a1}$ is stored in the memory of the control unit 200. For example, the first reference value $V_{a1}$ may be 10 km/h.

In step S614, when determining that the vehicle speed exceeds the reference value $V_{a1}$ (step S614: YES), the CPU of the control unit 200 sets the target electric power by the general fluctuation suppression process similar to that in the first embodiment (step S120).

When determining that the vehicle speed is equal to or less than the first reference value $V_{a1}$ in step S614 (step S614: NO), the CPU of the control unit 200 sets the target electric power by performing a fluctuation suppression reduction process which reduces the level of making a fluctuation of the target electric power smaller than a fluctuation of the request electric power at the time of performing the fluctuation suppression process such that the level becomes lower than the level when the vehicle speed exceeds the first reference value $V_{a1}$ (step S616). Since the operation of step S616 is performed in the same way as the operation of step S416 in the second embodiment, detailed description thereof is omitted.

In step S616, the CPU of the control unit 200 functions as a "fluctuation suppression reduction unit" which reduces the level of making the fluctuation of the target electric power smaller than the fluctuation of the request electric power, in accordance with the operating state of the fuel cell system 30. In the fourth embodiment, the "operating state of the fuel cell system 30" is defined as the vehicle speed of the fuel cell vehicle 20. When the target electric power is set in step S120 or step S616, the CPU of the control unit 200 outputs the instruction signals for generating target electric power (step S130), and ends the present routine.

Such configuration can restrain the fuel cell 100 from continuously being in the state of generating more electric power than the request electric power while the fuel cell vehicle 20 is in the stopped state or in the low-speed traveling state close to the stopped state. This makes it possible to restrain noise and vibration attributed to electric power generation by the fuel cell from giving the user of the vehicle a sense of discomfort. When the fuel cell vehicle 20 is in the stopped state or in the low-speed traveling state close to the stopped state, the driving level of the units of the fuel cell vehicle 20 is generally lowered, and therefore noise and vibration are decreased in the entire vehicle. Hence, the noise and vibration attributed to electric power generation by the fuel cell 100 tend to give the user of the vehicle a sense of discomfort. The control of the present embodiment can be defined as control for decreasing the noise and vibration when the fuel cell vehicle 20 is in the stopped state or in the low-speed traveling state close to the stopped state, in priority to restraining deterioration, or the like, of the units of the fuel cell system 30 attributed to fluctuation of the request electric power.

In the present embodiment, the first reference value $V_{a1}$ is set as a reference value indicating that the fuel cell vehicle 20 is in the stopped state, or in the low-speed traveling state close to the stopped state. However, different configurations may be adopted. When the fuel cell vehicle 20 travels relatively at low speed, the noise and vibration attributed to electric power generation by the fuel cell 100 generally tend to give the user of the vehicle a sense of discomfort. Accordingly, the first reference value $V_{a1}$ may properly be set in accordance with a desired decrease level of the noise and vibration.

The level of reducing fluctuation suppression in step S616 may not constantly be fixed. Rather, the level may be changed in accordance with a difference between the vehicle speed and the first reference value $V_{a1}$. In short, as the vehicle speed is smaller than the first reference value $V_{a1}$, the level of making the fluctuation of the target electric power smaller than the fluctuation of the request electric power may be reduced more. Specific operation for further reducing the level of making the fluctuation of the target electric power smaller than the fluctuation of the request electric power in the fluctuation suppression process may be similar to the operation described in the second embodiment.

E. Fifth Embodiment

Figure 12:
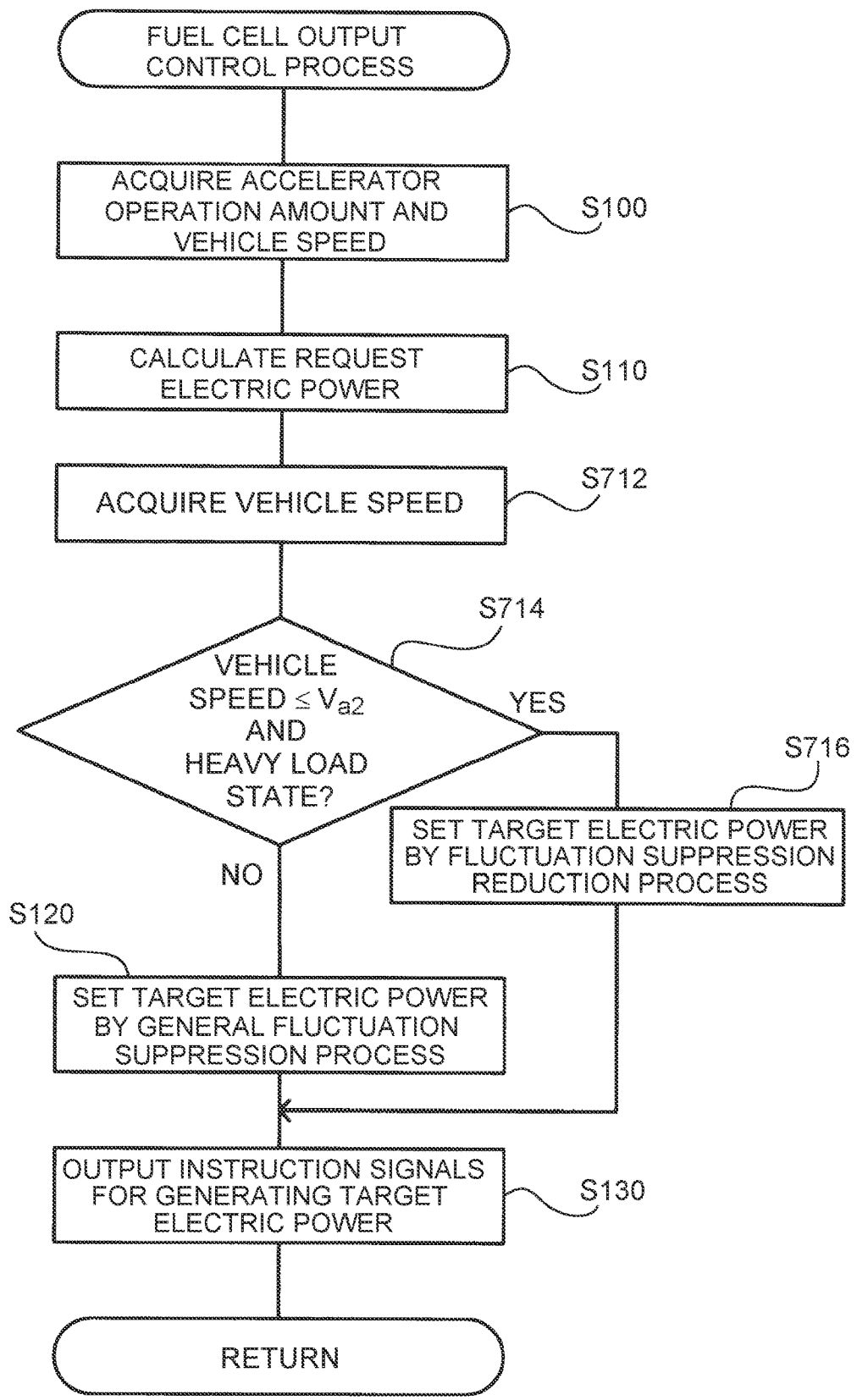
FIG. 12 is a flowchart showing another fuel cell output control process routine.

FIG. 12 is a flowchart showing a fuel cell output control process routine executed in the control unit 200 of the fuel cell system 30 as a fifth embodiment of the present disclosure, in place of the control process of the first embodiment shown in FIG. 2. The fuel cell system 30 of the fifth embodiment includes the same configuration as in the first embodiment. In FIG. 12, the processes similar to those in FIG. 2 are designated by the similar step numbers.

In the fifth embodiment, the CPU of the control unit 200 calculates request electric power in step S110, and then acquires the vehicle speed of the fuel cell vehicle 20 from a vehicle speed sensor (step S712). The CPU of the control unit 200 then compares the acquired vehicle speed with a predetermined second reference value $V_{a2}$, and determines whether a history of the output states of the fuel cell 100 corresponds to a predetermined high output state (step S714).

The second reference value $V_{a2}$ is preset as a criterion indicating that the vehicle speed is low to such an extent that cooling of the coolant using a running wind is not sufficiently performed in the radiator 530 of the fuel cell system 30. The second reference value $V_{a2}$ is stored in the memory of the control unit 200. For example, the second reference value $V_{a2}$ may be set to 80 km/h or less, may be set to 60 km/h or less. The second reference value $V_{a2}$ may properly be set in accordance with cooling performance and thermal capacity of the coolant in the radiator 530 when the radiator fan 535 is used, as well as in accordance with the electric power generation amount of the fuel cell 100 assumed in a later-described "high output state", or the like. The second reference value $V_{a2}$ of the fifth embodiment may be set as a larger value than the first reference value $V_{a1}$ of the fourth embodiment.

The "high output state" used for determination of step S714 is the state where the fuel cell 100 has a high output to the extent that when the general fluctuation suppression process shown in step S120 is continued, the temperature of the fuel cell 100 may rise to an undesirable level unless the running wind can be used in the radiator 530. Such "high output state" may be predetermined and be stored in the memory of the control unit 200. The high output state may optionally be set. For example, the high output state may be set based on the magnitude of the output of the fuel cell 100 during a period from a point of time tracing back for a predetermined determination period from the present time to the present time. In one example, when the determination period is set to, for example, 300 seconds, the "high output state" may be defined as the state where electric power generation continues up for 300 seconds or more to the present time with an output of 80% or more of the maximum output of the fuel cell 100. Whether the output state of the fuel cell 100 is the "high output state" may be determined using the electric power generated by the fuel cell 100, or using the target electric power set by the control unit 200.

When determining that the fuel cell vehicle does not satisfy criteria that the vehicle speed is equal to or less than the second reference value $V_{a2}$ and that the output state of the fuel cell 100 is equivalent to the high output state in step S714 (step S714: NO), the CPU of the control unit 200 sets the target electric power by the general fluctuation suppression process as in the first embodiment (step S120).

When determining that the vehicle speed is equal to or less than the second reference value $V_{a2}$, and the output state of the fuel cell 100 is equivalent to the high output state in step S714 (step S714: YES), the CPU of the control unit 200 sets the target electric power by the fluctuation suppression reduction process which reduces the level of making the fluctuation of the target electric power smaller than the fluctuation of the request electric power when the fluctuation suppression reduction process is performed such that the level becomes lower than the level when the criteria that the vehicle speed is equal to or less than the second reference value $V_{a2}$ and that the output state of the fuel cell 100 is equivalent to the high output state are not satisfied (step S716). Since the operation of step S716 is performed in the same way as the operation of step S416 in the second embodiment, detailed description thereof is omitted.

In step S716, the CPU of the control unit 200 functions as a "fluctuation suppression reduction unit" which reduces the level of making the fluctuation of the target electric power smaller than the fluctuation of the request electric power, in accordance with the operating state of the fuel cell system 30. In the fifth embodiment, the "operating state of the fuel cell system 30" is defined as the vehicle speed of the fuel cell vehicle 20, and the electric power generation amount of the fuel cell 100 during the determination period up to the present time. When the target electric power is set in step S120 or step S716, the CPU of the control unit 200 outputs the instruction signals for generating target electric power (step S130), and ends the present routine.

Such configuration can restrain excessive heat generation of the fuel cell 100, when the cooling power using a running wind in the radiator 530 is relatively low and the heat generation amount relating to electric power generation by the fuel cell 100 becomes relatively large, because the vehicle speed of the fuel cell vehicle 20 is equal to or less than the second reference value $V_{a2}$, and the history of the output states of the fuel cell 100 corresponds to a high output state. In other words, as compared with the case where the general fluctuation suppression process is performed, the degree that the target electric power follows the request electric power is increased. Accordingly, when, for example, the request electric power requested to the fuel cell 100 which is in the high output state drops, the target electric power can be reduced more swiftly. As a result, it is possible to restrain the temperature of the fuel cell 100 from rising to an undesirable level due to excessive amount of electric power being generated by the fuel cell 100 even though the vehicle speed is equal to or less than the second reference value $V_{a2}$. The control of the present embodiment can be defined as control for restraining temperature rise of the fuel cell 100 when there is an increased possibility that the cooling of the fuel cell 100 using a running wind becomes insufficient, in priority to restraining deterioration, or the like, of the units of the fuel cell system 30 attributed to fluctuation of the request electric power.

The level of reducing fluctuation suppression in step S716 may not constantly be fixed. Rather, the level may be changed in accordance with a difference between the vehicle speed and the second reference value $V_{a2}$, or in accordance with the output state of the fuel cell 100. In other words, as the vehicle speed is smaller than the second reference value $V_{a2}$ and/or the history of the output states of the fuel cell 100 corresponds to a higher output, the level of making the fluctuation of the target electric power smaller than the fluctuation of the request electric power may be reduced more. Specific operation for further reducing the level of making the fluctuation of the target electric power smaller than the fluctuation of the request electric power in the fluctuation suppression process may be similar to the operation described in the second embodiment.

F. Other Embodiments

F1

In each of the embodiments disclosed above, when the fluctuation suppression process is executed, the electric power excessively generated for request electric power is used to charge the secondary battery 650, whereas the electric power insufficient for the request electric power is supplied from the secondary battery 650. Accordingly, the state of charge of the secondary battery 650 may transitionally lower when the fuel cell system 30 stops. In such a case, when the fuel cell system 30 starts up next time, and the fluctuation suppression process is executed, the state of charge of the secondary battery 650 may be not sufficient enough to successfully execute a desired fluctuation suppression process. Accordingly, in the case where the state of charge of the secondary battery 650 is less than a predetermined reference value when the fuel cell system 30 stops, it is desirable that the fuel cell 100 continues to generate electric power and the fuel cell system 30 stops after the state of charge of the secondary battery 650 recovers to the reference value or more.

In the case where the fuel cell system 30 stops over a long period of time, the state of charge of the secondary battery 650 may gradually lower due to, for example, natural discharge. Accordingly, when the fuel cell system 30 starts up next time, the state of charge of the secondary battery 650 may become insufficient. As a solution, during the stop of the fuel cell system 30, it is desirable that, for example, the control unit 200 is started and the state of charge of the secondary battery 650 is monitored periodically. When the state of charge of the secondary battery 650 is less than the predetermined reference value, it is desirable that the fuel cell system 30 is started up and the secondary battery 650 is charged with the fuel cell 100 such that the state of charge of the secondary battery 650 is maintained at the reference value or more.

F2

As described in each of the embodiments, various processes can be adopted as the fluctuation suppression process. However, a specific process may be determined in advance as the fluctuation suppression process to be adopted for the fuel cell system, or a fluctuation suppression process may be selected out of a plurality of types of the fluctuation suppression processes. For example, when a plurality of types of operation modes, where any one of the fluctuation processes is adopted, can be selected in the fuel cell vehicle, a user, a vehicle mechanic, or the like, of the fuel cell vehicle 20 may be able to select and set which operation mode to adopt. Alternatively, it is also desirable that the control unit 200 is configured to automatically select and set the operation mode determined to be most advantageous, based on a travel state, energy efficiency, or the like, of the fuel cell vehicle 20.

F3

In each of the embodiments, the fuel cell system 30 is used as a power source for driving the vehicle. However, different configurations may also be adopted. For example, the fuel cell system 30 may be used as a power source for driving mobile objects other than the vehicle, and may also be used as a stationary power source. Executing one of the fluctuation suppression processes similarly provide the effect of restraining the inconvenience attributed to an output fluctuation of the fuel cell. In this case, the electric power necessary because the target electric power of the fuel cell does not reach the request electric power may be supplied from the outside of the fuel cell system instead of being supplied from the electric storage device included in the fuel cell system. The electric power excessive because the target electric power of the fuel cell is more than the request electric power may be supplied to the outside of the fuel cell system instead of being used for charging the electric storage device included in the fuel cell system.

Without being limited to the aforementioned embodiments, the present disclosure can be implemented in various configurations without departing from the meaning thereof. For example, technical features in the embodiments corresponding to the technical features in each aspect disclosed in SUMMARY can properly be replaced or combined in order to solve some or all of the aforementioned problems, or in order to accomplish some or all of the aforementioned effects. The technical features may properly be deleted unless otherwise specified as essential elements in this specification.

What is claimed is:

1. A fuel cell system configured to supply electric power to load, comprising:
   a fuel cell; and
   a control unit programmed to set target electric power to be generated by the fuel cell and control electric power generation by the fuel cell such that the fuel cell generates the target electric power, wherein
   the control unit is programmed to, when setting the target electric power using request electric power that the load requests the fuel cell to generate, execute a fluctuation suppression process for making a fluctuation of the target electric power smaller than a fluctuation of the request electric power;
   wherein the control unit includes a fluctuation suppression reduction unit programmed to reduce, in accordance with an operating state of the fuel cell system, a level of making the fluctuation of the target electric power smaller than the fluctuation of the request electric power in the fluctuation suppression process;
   wherein the fluctuation suppression process is an equalization process repeatedly executed in the control unit for calculating a representative value, among values each including target electric power, set during a period from a time point tracking back for a predetermined reference period from present time to a time point when the target electric power is previously set, and request electric power at the present time, and setting the representative value as the target electric power; and
   the fluctuation suppression reduction unit is programmed to reduce the level of making the fluctuation of the target electric power smaller than the fluctuation of the request electric power, by shortening the reference period in the fluctuation suppression process.

2. A fuel cell system configured to supply electric power to load, comprising:
   a fuel cell; and
   a control unit programmed to set target electric power to be generated by the fuel cell and control electric power generation by the fuel cell such that the fuel cell generates the target electric power, wherein
   the control unit is programmed to, when setting the target electric power using request electric power that the load requests the fuel cell to generate, execute a fluctuation suppression process for making a fluctuation of the target electric power smaller than a fluctuation of the request electric power;
   the control unit includes a fluctuation suppression reduction unit programmed to reduce, in accordance with an operating state of the fuel cell system, a level of making the fluctuation of the target electric power smaller than the fluctuation of the request electric power in the fluctuation suppression process;
   the fluctuation suppression process is a change rate regulation process for setting the target electric power by setting an upper limit for an increment of the target electric power per unit time, while setting a lower limit for a decrement of the target electric power per unit time; and
   the fluctuation suppression reduction unit is programmed to reduce the level of making the fluctuation of the target electric power smaller than the fluctuation of the request electric power, by increasing the upper limit while decreasing the lower limit in the fluctuation suppression process.

3. A fuel cell system configured to supply electric power to load, comprising:
a fuel cell; and
a control unit programmed to set target electric power to be generated by the fuel cell and control electric power generation by the fuel cell such that the fuel cell generates the target electric power, wherein
the control unit is programmed to, when setting the target electric power using request electric power that the load requests the fuel cell to generate, execute a fluctuation suppression process for making a fluctuation of the target electric power smaller than a fluctuation of the request electric power;
the control unit includes a fluctuation suppression reduction unit programmed to reduce, in accordance with an operating state of the fuel cell system, a level of making the fluctuation of the target electric power smaller than the fluctuation of the request electric power in the fluctuation suppression process;
the fluctuation suppression process is a staged process for dividing an allowable range of the request electric power into a plurality of divided ranges, and increasing the target electric power in stages in accordance with increase in the request electric power such that when the request electric power belongs to an identical divided range, identical target electric power is set; and
the fluctuation suppression reduction unit is programmed to reduce the level of making the fluctuation of the target electric power smaller than the fluctuation of the request electric power, by increasing the number of the divided ranges obtained by dividing the allowable range of the request electric power in the fluctuation suppression process.

* * * * *